US006510619B2

(12) United States Patent
Mills

(10) Patent No.: US 6,510,619 B2
(45) Date of Patent: Jan. 28, 2003

(54) WALLPAPER TEMPLATE FOR CLOSURES

(76) Inventor: Gregory Mills, 20 Knights Bridge La., Boynton Beach, FL (US) 33426

(*) Notice: Subject to any disclaimer, the term of this patent is extended or adjusted under 35 U.S.C. 154(b) by 0 days.

(21) Appl. No.: 09/794,979

(22) Filed: Feb. 28, 2001

(65) Prior Publication Data

US 2002/0116835 A1 Aug. 29, 2002

(51) Int. Cl.[7] .............................. G01B 3/14; B43Q 7/00

(52) U.S. Cl. ............................................ 33/563; 33/566

(58) Field of Search .......................... 33/563, 566, 562, 33/565, 1 B, 1 BB; 160/236; 206/232, 575, 321, 325

(56) References Cited

U.S. PATENT DOCUMENTS

| | | | | | |
|---|---|---|---|---|---|
| 292,463 | A | * | 1/1884 | Bassett | 33/197 |
| 2,245,339 | A | * | 6/1941 | Harris et al. | 33/563 |
| 2,595,142 | A | * | 4/1952 | Herck | 33/562 |
| 4,056,190 | A | * | 11/1977 | Dix | 206/349 |
| 4,154,343 | A | * | 5/1979 | Lautenschlager et al. | 33/197 |
| 5,263,529 | A | * | 11/1993 | Landis | 160/236 |
| 5,491,902 | A | * | 2/1996 | Uhrin et al. | 33/563 |
| 5,749,149 | A | * | 5/1998 | Claytor | 33/566 |
| 6,024,821 | A | * | 2/2000 | Cousineau | 156/267 |
| 6,105,775 | A | * | 8/2000 | Truc | 206/455 |
| 6,155,413 | A | * | 12/2000 | Bilanchone | 206/229 |
| 6,418,635 | B1 | * | 7/2002 | Nelson et al. | 33/563 |
| 2002/0104228 | A1 | * | 8/2002 | Hill | 33/566 |

* cited by examiner

*Primary Examiner*—Diego Gutierrez
*Assistant Examiner*—Mirellys Jagan
(74) *Attorney, Agent, or Firm*—Thomas L. Adams

(57) ABSTRACT

A wallpaper template can be used to cut wallpaper pieces in order to cover a closure such as a door, shutter or blind that may have a plurality of segments and frame elements. The wallpaper template has a plurality of indicia or apertures that are placed on a separate sheet or on a container for the closure. The indicia and apertures are arranged to define: (a) a segment pattern for outlining each of the segments; and (b) a closure pattern for outlining the closure. Thus, wallpaper can be cut by following the indicia or apertures.

26 Claims, 6 Drawing Sheets

WALLPAPER TEMPLATE FOR CLOSURES

BACKGROUND OF THE INVENTION

1. Field of the Invention

The present invention relates to wallpaper templates, and in particular, to templates for applying wallpaper to closures such as doors, shutters, blinds, and the like.

2. Description of Related Art

Commonly employed interior closures include bifold doors, sliding doors and window shutters. These closures often have a number of parallel slats forming a louver. Doors (whether bifold or sliding) often have a cross member separating an upper section of louvers from a lower section that may have either additional louver slats or raised panels. Still other doors will have no louver slats or cross member, but will simply have a number of raised panels. Interior shutters typically have louvers slats running from top to bottom without an intervening cross member. Some shutters will have louver slats with a central longitudinal ridge, although such ridges may not be found in other shutters and will most likely not be found in sliding doors or bifold doors.

It will be appreciated that reference in this specification to closures will include all of the foregoing described doors and shutters, but will not be limited to such doors and shutters. Furthermore, descriptions specifically referring to one type of door or shutter will be deemed applicable to all types of closures, as the term is used herein.

Home decorators will at times use wallpaper to cover a window shutter or a door (including sliding or bifold doors). This task can be rather difficult when the door or shutter has louvers or raised panels. For louvered closures one difficulty is the large number of small pieces that must be cut. Maintaining a consistent size from piece to piece can be difficult. With some techniques the pieces may tend to grow or shrink for successive pieces.

In U.S. Pat. No. 5,491,902 a transparent template made of a vinyl plastic or paper material is laid over a wall opening and the wallpaper pattern along the opening is traced onto the template. Thereafter, the template is laid over another piece of wallpaper in alignment with the tracings, before cutting the wallpaper using the outline of the template. The piece of wallpaper thus cut is then applied to a switch plate cover that is finally mounted over the opening. FIG. 15 of this reference also discloses using the template for applying wallpaper to a register. This reference does not disclose a template that would be useful for cutting pieces to cover such closures as a door or shutter. Also, the reference does not disclose printing the template onto a box containing the closure. Moreover, the reference does not disclose how to handle closures that may have a complex structure such as raised panels or louvers.

In U.S. Pat. No. 292,463 paper or other flexible material is printed with markings that serve as a template for cutting a door to be fitted with a lock. The template may be contained in a larger sheet and may be removed by tearing along perforations. The sheet may be large enough to serve as the "wrapper for the locks in packing." Page 2, line 12. This reference is concerned with cutting a door and not with cutting wallpaper.

In U.S. Pat. No. 4,154,343 a box has a plastic cover with several holes serving as a drilling template for installing a hinge contained in the box. Again, this reference is concerned with cutting a door and not with cutting wallpaper.

U.S. Pat. No. 6,024,821 discloses using a plastic sheet as a template for cutting a wallpaper border for forming a joint. This reference is unconcerned with covering closures.

See also, U.S. Pat. No. 5,860,219 (template slidably mounted on a wall-boarder's or carpenter's square for marking an opening for an electrical outlet box); and U.S. Pat. No. 4,056,190 (template having the same outline as a tool).

Accordingly, there is need for a device to simplify the cutting of wallpaper so that closures such as doors or shutters can be easily and accurately covered.

SUMMARY OF THE INVENTION

In accordance with the illustrative embodiments demonstrating features and advantages of the present invention, there is provided a wallpaper template for cutting wallpaper pieces in order to cover a closure that has a spaced plurality of segments. The wallpaper template has a sheet with a plurality of apertures arranged to define: (a) a segment pattern for outlining each of the segments; and (b) a closure pattern for outlining the closure.

In accordance with another aspect of the present invention, a wallpaper template can be used to cut wallpaper pieces in order to cover a closure that has a spaced plurality of segments. The wallpaper template has a sheet with indicia arranged to define: (a) a segment pattern for outlining each of the segments; and (b) a closure pattern for outlining the closure. Thus, wallpaper can be cut by following the indicia on the sheet.

In accordance with yet another aspect of the present invention, a wallpaper template for cutting wallpaper pieces in order to cover a closure, includes a container. This container is sized to hold the closure and has indicia arranged to define a closure pattern for outlining the closure. Thus, wallpaper can be cut by following the indicia on the container.

In accordance with still another aspect of the present invention, a wallpaper template includes a sheet for cutting wallpaper pieces in order to cover a door, shutter, or blind that has a plurality of elements. This sheet has indicia arranged to define a closure pattern for outlining the elements of the closure. Thus, wallpaper can be cut to cover the elements by following the indicia on the sheet.

By employing devices of the foregoing type, wallpaper can be easily and accurately cut in order to cover closures such as single doors, bifold doors, sliding doors, window shutters, and the like. In one preferred embodiment, a box containing one or more doors or shutters can itself be used as a template. For example, round holes or slots can be cut into the box in a pattern matching the goods inside the box. The installer then simply lays the pattern over the wallpaper (cutting the box open or into segments, as needed) and marks the wallpaper through the holes or slots. Thereafter, the markings can be used as a cutting guide. If desired, the markings can be used to draw continuous lines for high accuracy cuts.

For louvered closures, a pattern can follow the outside perimeter of the closure and an inside perimeter surrounding the louvers. (Louver slats may be located in one or more sections on either side of a cross member; or may run from top to bottom in a window shutter.) There may also be placed within the inside perimeter a series of contiguous rectangles defining individual louver slats. For doors with raised panels, a pattern corresponding to the raised panels may be inscribed within the inside perimeter of a pattern corresponding to the door area surrounding the raised panels. With raised panels having curved peripheral segments, the template pattern can be formed with closely spaced holes or with curved slots that enable the installer to accurately cut a curve.

While the template may be formed by apertures in a box, in other embodiments the apertures may be closely spaced perforations that allow an installer to press a figure out of the box that can then be laid over the wallpaper to be cut. Alternatively, the figure pressed out of the box may leave an opening that is itself used as a template. In still other embodiments, the box may be simply marked with printed indicia.

In other situations a separate template that is not part of a box may be sold with the closure or as a separate product independently of the closure. This separate template may be a sheet that has indicia in the form of printed markings or in the form of apertures cut into the sheet.

Also, templates may be marked with alternate indicia for closures of various sizes. In such cases one template may serve a variety of closures of standard sizes.

BRIEF DESCRIPTION OF THE DRAWINGS

The above brief description as well as other objects, features and advantages of the present invention will be more fully appreciated by reference to the following detailed description of presently preferred but nonetheless illustrative embodiments in accordance with the present invention when taken in conjunction with the accompanying drawings, wherein.

DETAILED DESCRIPTION OF THE PREFERRED EMBODIMENTS

Figure 1:
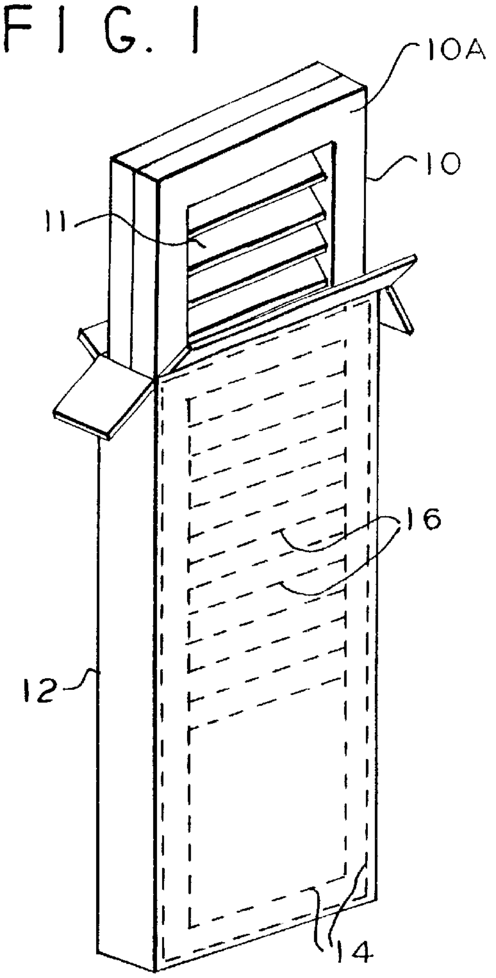
FIG. 1 is a perspective view of a closure (exemplary bifold door, sliding door or shutter) in a container that has a template made from indicia in the form of markings, apertures or perforations; generally the louvers in shutters run from top to bottom, while bifold doors have lower groupings separated by a central cross member.

Referring to FIG. 1 a closure 10 is shown partially contained in container 12. Closure 10 is shown here as a louvered, bifold door with louver slats 11, although other closures are contemplated; such as simple doors, sliding doors, window shutters, doors with raised panels, and various closures of different sizes and proportions. These various closures and may have a cross member separating an upper and lower section, but such course members will generally not be used for window shutters. Louver slats 11 (and other elements such as raised panels) are herein referred to as segments.

The front of container 12 has two patterns, specifically, closure pattern 14 and segment pattern 16. Closure pattern 14 is shown as a pair of nested rectangles matching the outline of frame 10A of closure 10. Segment pattern 16 is shown as a contiguous plurality of rectangles lying within the inner rectangle of pattern 14. Each of the rectangles of pattern 16 have a length and width matching that of louver slats 11. In other embodiments, segment pattern 16 can be placed on the opposite side of container 12, leaving the interior of closure pattern 14 available for the printing of descriptive or promotional material.

In some embodiments, patterns 14 and 16 may simply be printed indicia serving as a guide so that an installer can cut out figures that are then used as templates. In this embodiment, however, closure pattern 14 has closely spaced perforations that enable one to press out a rectangular, annular figure that may itself be placed over wallpaper and used as a template for cutting a wallpaper piece that will be pasted onto frame 10A of closure 10.

When pattern 14 is removed, segment pattern 16 then remains as a panel that was pressed out of the center of pattern 14. In this embodiment, pattern 16 is composed of a number of apertures that are simply small round holes. An installer can lay pattern 16 on a sheet of wallpaper and mark the wallpaper by inserting a pen or other marker through the holes of pattern 16. Optionally, the installer and can draw lines connecting these markings and thereby draw a contiguous plurality of rectangles. Thereafter, the installer can cut a number of small rectangles from the marked wallpaper and use these individual wallpaper rectangles to cover the louver slats 11.

Because louver slats 11 are canted, they cover an area longer than the front of container 12. For this reason, the illustrated pattern 16 does not attempt to provide a template for all slats simultaneously. Instead, only half of the slats are modeled and therefore the template will be used twice in order to produce a sufficient number of wallpaper rectangles to cover all of the louver slats. On the other hand, for doors having louver slats located only above a central cross member, sufficient space may exist to allow designation of each of the louver slats.

It will be appreciated that as an alternative, the closure pattern 14 may itself be made of a number of small round holes that are not spaced closely enough to enable one to press out a figure, but instead allow one to mark the wallpaper to be cut.

Figure 2:
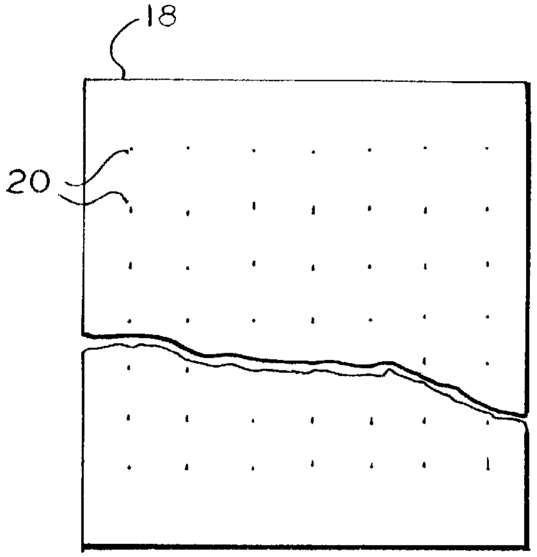
FIG. 2 is a front view of a template sheet pierced with apertures forming a segment and closure pattern.

Referring to FIG. 2, an alternate template is shown for cutting wallpaper pieces for covering louver slats. This template is shown as a sheet 18 with a segment pattern 20, which eliminates the need for pattern 16 of FIG. 1. Pattern 20 is shown as a matrix of compact, round holes. The holes 20 are shown in seven columns, although in other embodiments a different number of columns may be used. Also in some embodiments, lines may be printed between the holes 20 to indicate the layout of individual louver slats. Alternatively, holes 20 may be elliptical or formed as slots oriented along the sides of the rectangles to be marked onto the wallpaper.

Sheet 18 may be made of paper, sheet plastic, fabric, composite plies, or other material. Sheet 18 may be a separate item inserted inside container 12 of FIG. 1. In other embodiments, sheet 18 may be obtained by separating a panel from one of the faces of a container (such as container 12 of FIG. 1) by cutting along printed indicia, or by bursting perforations formed in the container. Alternatively, sheet 18 may be sold as a separate product that may be folded or rolled into a compact shape.

In this embodiment, the perimeter of sheet 18 may be used as a template defining the outside dimension of the frame 10A of FIG. 1. The inside dimension of frame 10A can be marked using the outermost holes 20. Accordingly, sheet 18 together with its holes 20 constitute both a closure pattern and a segment pattern.

While the foregoing assumed a door having louver slats, such a design is merely exemplary. The various contemplated designs include doors (bifold or sliding) with louvers that cover only a portion of a door, or with two groups of louvers that may be placed above and below a central cross piece. Other designs will not have louvers, and may have instead raised panels or other features. Still other designs will deal with window shutters having louver slats (with or without central longitudinal ridges) located from the top to bottom of the shutter.

Figure 3:
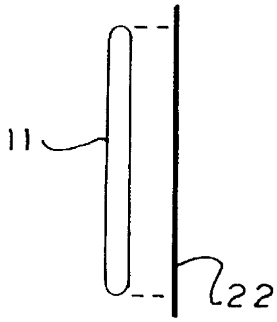
FIG. 3 is an end view of one of the slats of the louvered, door or shutter of FIG. 1, showing a mating piece of wallpaper about to be pasted thereto; louvers can be smooth or have a central longitudinal ridge. Generally, this ridge is found in shutter louvers.

Referring to FIG. 3, previously mentioned louver slat 11 is shown adjacent to a rectangular wallpaper piece 22, which is about to be pasted onto one face of slat 11. Preferably, wallpaper piece 22 does wrap around the edges of slat 11.

Figure 6:
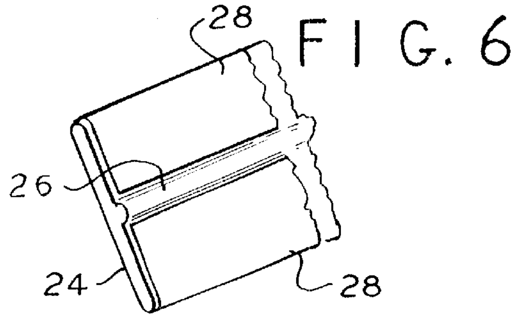
FIG. 6 is a perspective view of a louver slat for a shutter with the wallpaper pieces pasted thereto.
Figure 4:
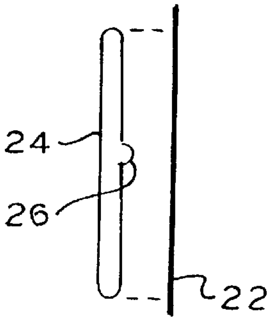
FIG. 4 is an end view of a slat typically found in a louvered shutter and that is an alternate to that of FIG. 3, showing a mating piece of wallpaper about to be pasted thereto.
Figure 5:
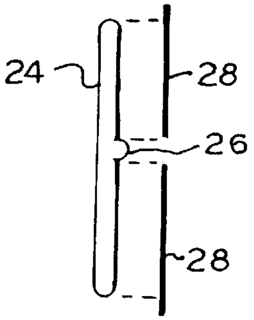
FIG. 5 is an end view of the slat of FIG. 4, showing a complementary pair of wallpaper pieces about to be pasted thereto.

An alternate louver slat 24 shown in FIG. 4 has a central longitudinal ridge 26 generally found in shutters. In this embodiment, an identical wallpaper piece 22 will be pasted over slat 24. Alternatively, as shown in FIGS. 5 and 6, a wallpaper piece can be cut into two smaller, rectangular pieces 28 that are pasted on either side of ridge 26, leaving the ridge exposed.

Figure 7:
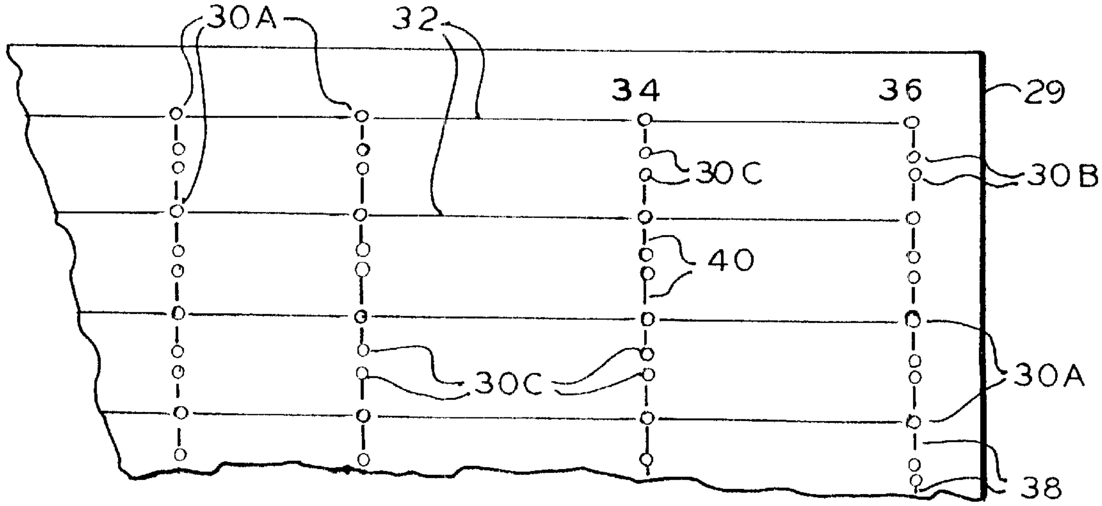
FIG. 7 is a fragmentary, front view of a corner of a sheet that is an alternate to that of FIG. 2.

FIG. 7 shows a template for cutting these pairs of smaller rectangular wallpaper pieces. Sheet 29 is pierced with a plurality of apertures in the form of compact round holes 30A, 30B and 30C. Apertures 30A constitute the overall boundary for a pair of rectangles, with apertures 30B and 30C marking the gap between these two rectangles (essentially used only for window shutters with longitudinal ridges). Accordingly, each pair of rectangles is cut to allow a gap in the wallpaper pattern so when laid on opposite sides of the previously mentioned ridge, they provide a coherent appearance. It will be appreciated that in other embodiments, the need for this gap is not deemed important, in which case the pair of rectangles will be cut from contiguous areas on the wallpaper.

For embodiments designed to handle louver slats for doors, there normally will be no longitudinal ridge. Accordingly, for such embodiments the apertures 30B and 30C will be eliminated.

Sheet 29 is printed with a number of lines 32 drawn to holes 30A for showing the outline of the pairs of rectangles. Lines are not drawn to all of the holes 30B and 30C, although such lines could be drawn in other embodiments. Lines 38 are drawn however, along the outer longitudinal edge of sheet 29 between holes 30A and 30B to indicate the outer edge of the louvers.

This template design contemplates use with various sizes of doors and shutters. When line 38 is used as the outer edge of the rectangles, the installer is dealing with a nominally 36 inch (91 cm) door composed of bifold doors, each slightly less than 18 inches (46 cm). Accordingly, the numeral "36" is printed on sheet 29 above line 38. Other times, an installer will be dealing with a 34 inch door (a nominally 86 cm bifold door, with each door slightly less than 17 inches or 43 cm). With the 34 inch bifold door, the outer edge of the louvers are marked by line 40 and the numeral "34" is printed above line 40. Therefore, the installer will use all of the holes 30C along line 40, but none of the holes to the right. It will be appreciated that still narrower doors (for example, a 30 inch door) can be accommodated by similar features toward the left of sheet 29, which features would not be visible in the fragmentary view of FIG. 7.

While the foregoing mentions bifold doors, the foregoing teachings can be equally applied to sliding doors or shutters.

Figure 8:
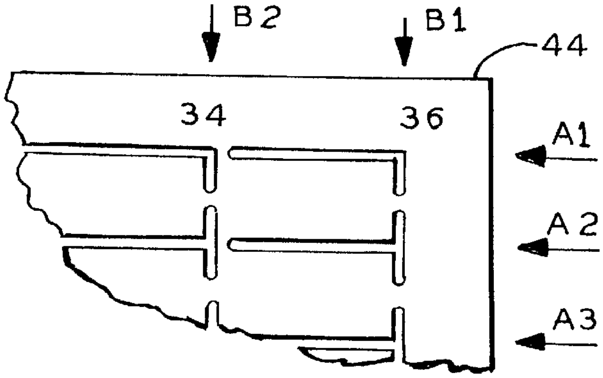
FIG. 8 is a fragmentary, front view of a corner of a sheet that is an alternate to that of FIG. 7.

Referring to FIG. 8, alternate template sheet 44 is an arrangement similar to that of FIG. 7, but with the previous holes replaced with slots. Essentially, sheet 44 has a stencil-like pattern that divides the template into a series of rectangles along transverse lines A1, A2, and A3 (corresponding to previously mentioned lines 32) and along longitudinal lines B1 and B2 (corresponding to lines 38 and 40, respectively).

With this arrangement the installer can simply trace the pattern indicated by the stencil directly onto the wallpaper. As before, the upper edge of sheet 44 is marked with the legends, "36" and "34" to indicate the lines to be used for different sizes of doors (or for that matter shutters). The breaks in the longitudinal lines B1 and B2 may be set to indicate a gap in the wallpaper required to accommodate a longitudinal ridge in a louver slat, but that feature normally will be unnecessary for doors.

Figure 9:
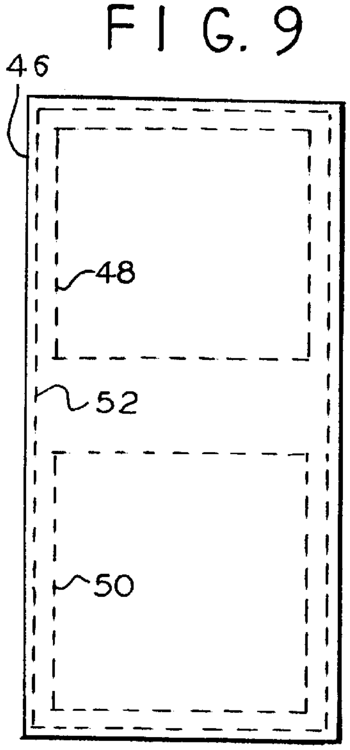
FIG. 9 is an front view of a container with indicia forming a template that is an alternate to that of FIG. 1.
Figure 10:
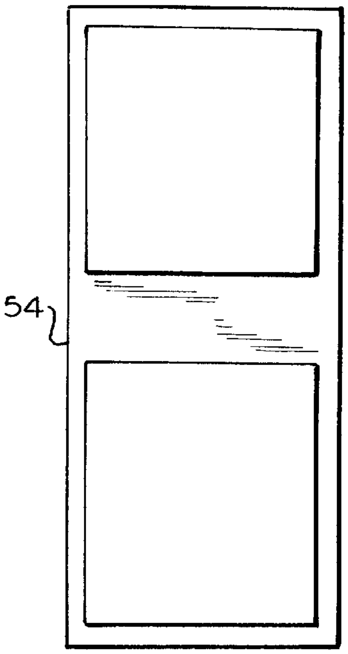
FIG. 10 is an front view of a figure that was pressed out of the container of FIG. 9.

Referring to FIG. 9, container 46 can contain a door having upper and lower rectangular regions filled with louvers (not shown). These upper and lower regions are separated by a cross piece. Instead of louvers, these two regions can each contain a large raised panel or other features. Patterns corresponding to these upper and lower regions are outlined by rectangular indicia 48 and 50. Both of these patterns are surrounded by the encompassing rectangular pattern 52. While patterns 48, 50 and 52 may simply be printed indicia, in this embodiment they are closely spaced perforations that allow one to press a figure out of the face of container 46. The resulting FIG. 54 shown in FIG. 10 corresponds to the frame of the door normally contained within container 46. The FIG. 54 can be laid atop a piece of wallpaper and used to trace guidelines indicating where the wallpaper is to be cut.

Figure 11:
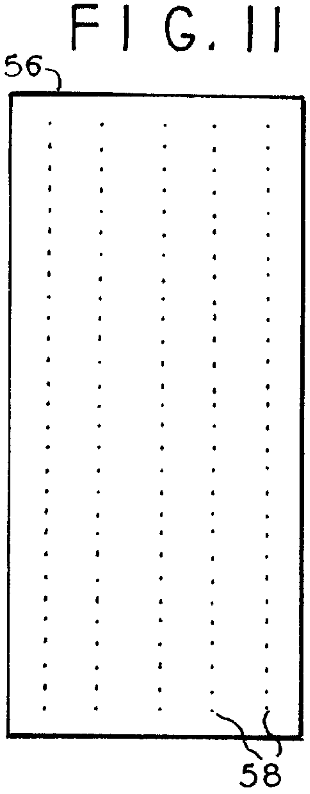
FIG. 11 is a front view of a template for use with the container of FIG. 9.

Assuming the door in container 46 of FIG. 9 has louvers, a segment pattern 56 can be included as shown in FIG. 11. Pattern 56 may employ a number of apertures 58 in the form of round holes. These holes may be used to mark wallpaper so that a number of rectangles can be cut therefrom. These rectangles can be pasted onto louvers associated with the door contained in container 46. In some embodiments template 56 may be a separate sheet inserted inside container 46 of FIG. 9. In alternate embodiments, the template may be formed by simply punching holes into another face of container 46.

Figure 12:
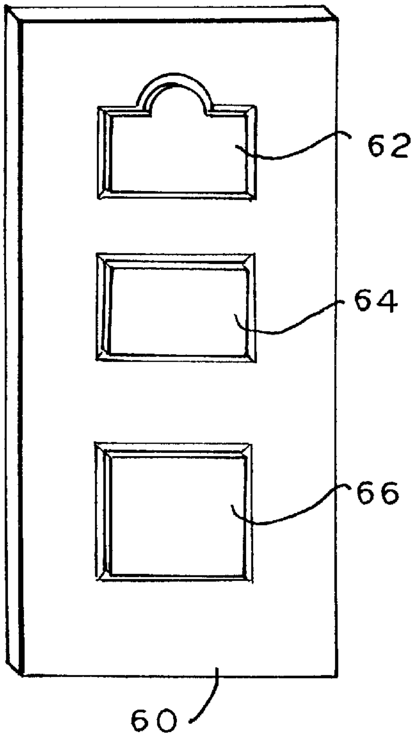
FIG. 12 is an elevational view of a door with raised panels.

Referring to FIG. 12, another closure is shown as a door 60 having segments in the form of raised panels 62, 64, and 66. These panels are raised relative to the groove surrounding each of them (although they may in fact not be raised relative to the main, flat regions of door 60).

Figure 13:
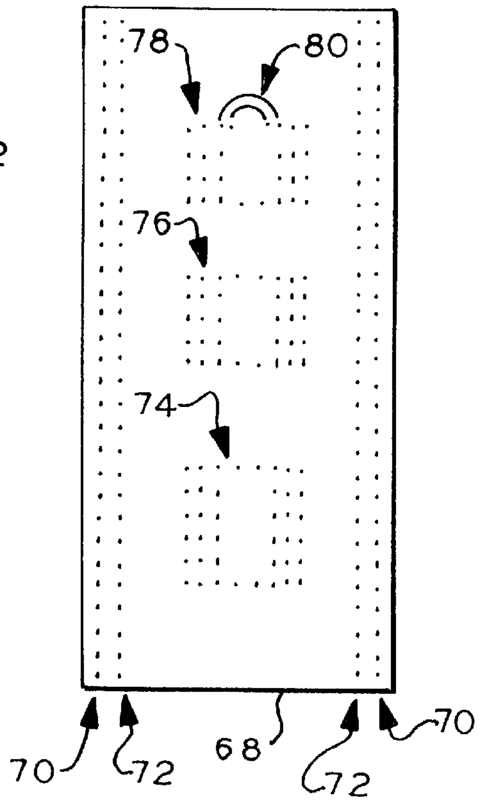
FIG. 13 is a front view of a sheet having apertures forming a template for use with doors of the type shown in FIG. 12.

Referring to FIG. 13, a template 68 is shown as a sheet having a number of apertures punched therein. For a larger, standard width door, the perimeter of template 68 may be used to mark the overall outline of the door onto wallpaper. For smaller, standard size doors, the width may be marked using either the column of apertures 70 or 72, depending upon the door width.

The raised panel segments on some standard doors remain at the same elevation and maintain the same height as the door width varies. The width of the raised panel segment can vary, however, with door width. Accordingly, a segment pattern 74 is shown with two parallel, transverse (horizontal) rows of apertures. Pattern 74 also has three alternate pairs of longitudinal (vertical) columns of apertures. The specific pair that will be chosen will depend upon the width of the raised panel segment, which in turn varies with door width. Middle segment pattern 76 is essentially the same, but proportioned for the specific proportions of panel 64 (FIG. 12).

Upper segment pattern 78 is essentially the same as the other patterns, except for the arched upper portion designed to accommodate the arch of raised panel segments 62 of FIG. 12. For this purpose, pattern 78 is shown with a number of semicircular slots 80. Slots are preferred for a curved outline since a well formed continuous line can be easily drawn therefrom. Of course, the shape of slots 80 can be altered to suit the specific curve being modeled.

Figure 14:
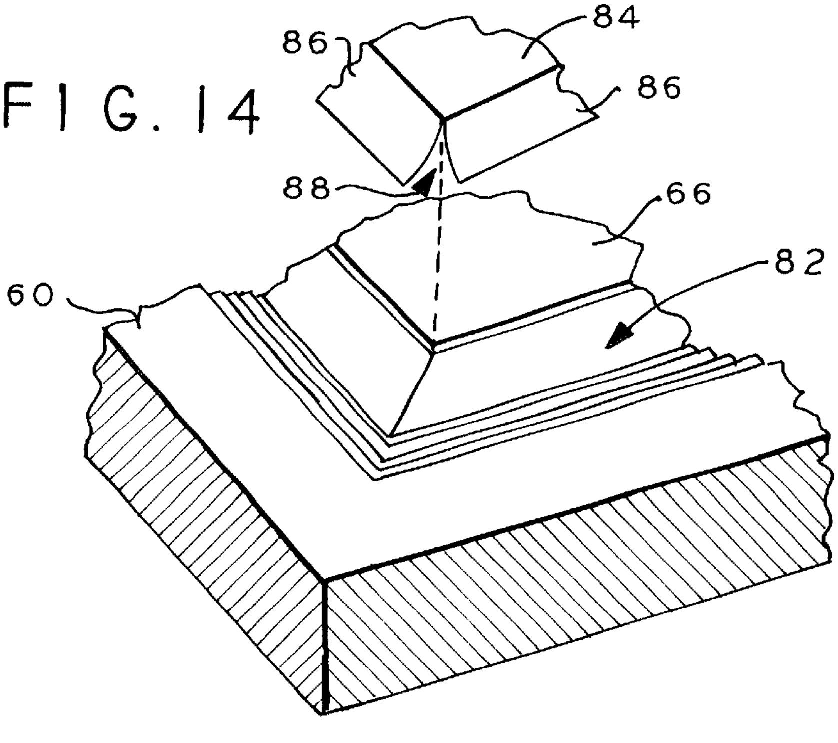
FIG. 14 is a detailed, fragmentary, perspective view of a portion of the door of FIG. 12 showing a piece of wallpaper being installed around the corner of a raised panel.
Figure 15:
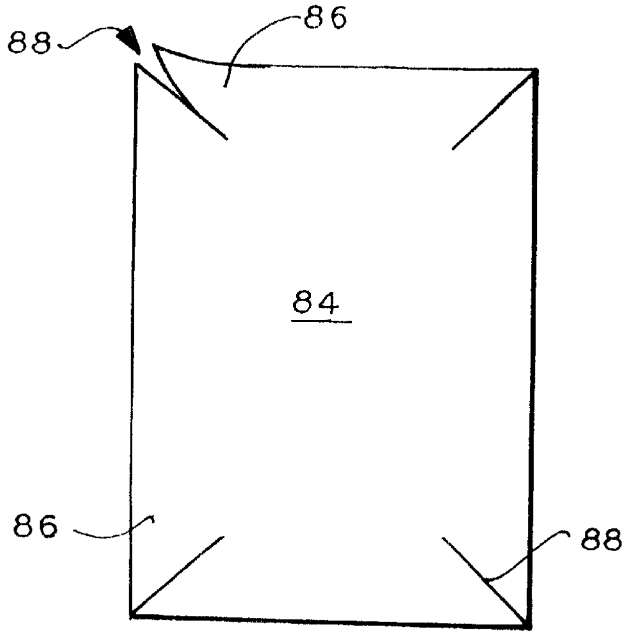
FIG. 15 is a plan view of the piece of wallpaper shown in FIG. 14.

Referring to FIGS. 14 and 15, raised panel segment 66 of previously mentioned door 60 is shown surrounded by a groove 82, smooth on the inside bank and stepped on the outside bank. In some cases a wallpaper segment 84 is to be fitted inside groove 82. The flap portions 86 can fold down onto the smooth bank of groove 82. Flaps 86 can be relieved with a notch 88 to accommodate the three dimensional nature of the panel segment 66 and groove 82. Segment 84 is essentially a rectangular cutout with notches 88 in the form of short diagonal slits lying at an angle of 45° with respect to the sides of the rectangle. These slits enable flaps 86 to fold down and slightly overlap each other. In some embodiments, slits 88 may be V-shaped cutouts that enable flaps 86 to fold down and abut each other without overlapping. In any event, the template of FIG. 13 can have alternate outlines depending upon whether one wishes to fill the groove 82.

Figure 16:
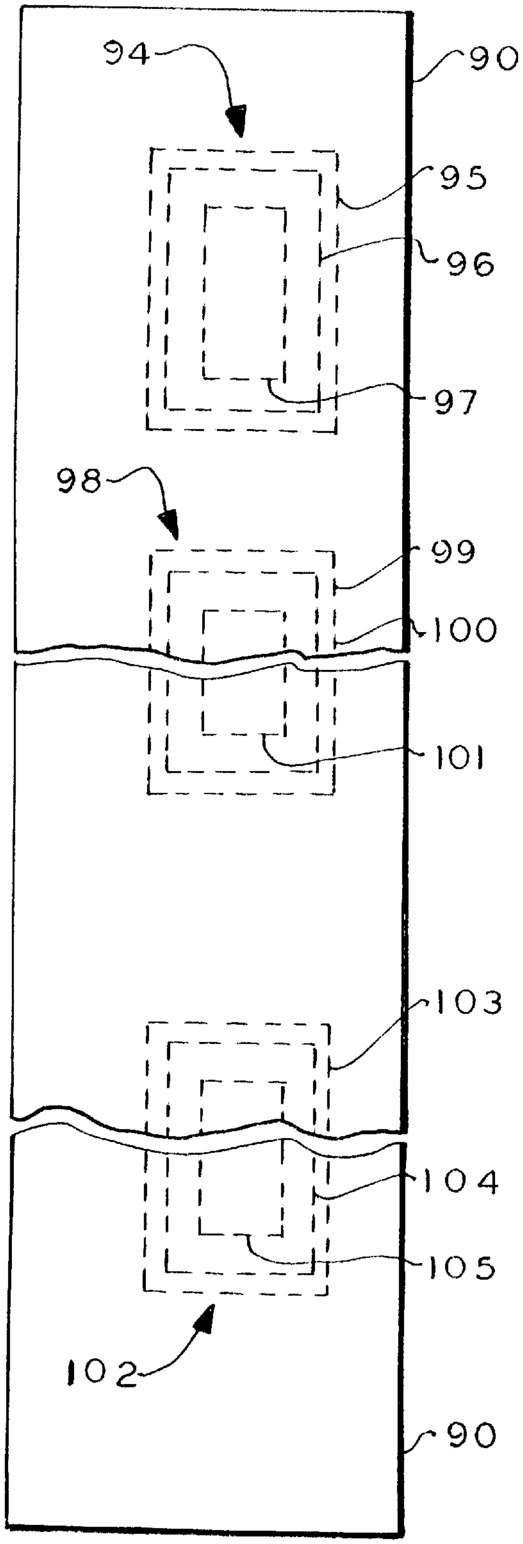
FIG. 16 is a front view of a sheet having apertures forming a template for use with bifold doors having raised panels.

Referring to FIG. 16, template 90 is arranged to enable one to cut wallpaper to cover a pair of bifold doors that are hinged together. Basically, the illustrated face of the template can be used to cut out coverings for the left half of the bifold door. For the right half, the reverse side of the template will be used to enable one to cut the wallpaper as a mirror image.

The border of template 90 may be used to mark the outside edge of the pattern on wallpaper. In this embodiment each of the doors is a standard height and 11¾ inches (30 cm) wide, although obviously the template can be modified to accommodate doors of different sizes.

Each of the bifold doors has three raised panels as indicated by patterns 94, 98, and 102. Pattern 94 is formed of three nested rectangular outlines 95, 96, and 97. Each of these outlines is made of a series of short slots that enable an installer to mark the underlying wallpaper. In this embodiment, pattern 94 has an overall width of 5¹³⁄₁₆ (14.8 cm) and an overall height of 8½ inches (21.6 cm), although this pattern size can vary depending upon the size of the raised panel being accommodated. Patterns 98 and 102 have the same width, but are 24 inches (61 cm) long. Pattern 98 is formed of three nested rectangular outlines 99, 100, and 101. Pattern 102 is formed of three nested rectangular outlines 103, 104, and 105.

The outermost borders 95, 99, and 103 are designed to mark openings in wallpaper sheets whose outside borders are demarked by the outside edges of template 90. The other two inside borders (pairs 96/97, 100/101, and 104/105) mark the inside and outside edges of flaps 86 of the wallpaper piece shown in FIG. 15 (with proportions appropriate for the different sizes of raised panels).

Figure 17:
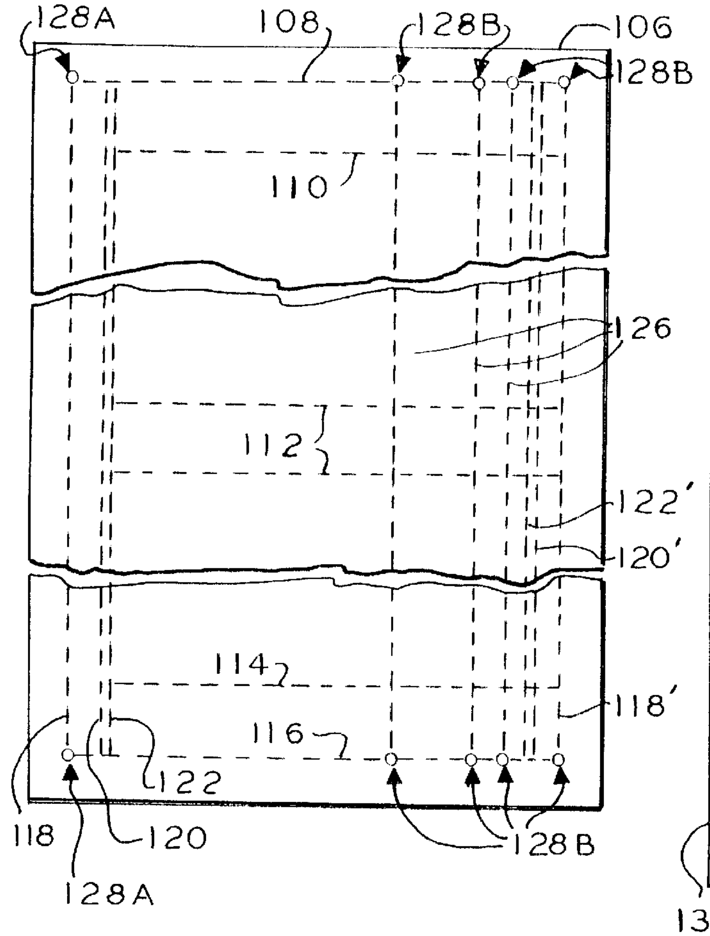
FIG. 17 is a front view of a sheet having apertures forming a template for use with a door having two sets of louver slats located above and below a central cross-member.

Referring to FIG. 17, another template 106 is designed to trace a pattern for a door having three cross-members; namely, a top, middle, and bottom cross-member, each typically 3½ inches (8.9 cm) high, except for the middle cross-member, which is 3¼ inches (8.26 cm) high. The top cross-member is embraced by lines 108 and 110. The middle cross-member is embraced by lines 112. The bottom cross-member is embraced by lines 114 and 116. For each of these cross-members (top, middle and bottom) their two ends are defined by lines 122 and 122'. Typically, the door would have louvered slats between these cross-members (although in some embodiments the section below the middle cross member may have raised panels).

The door would have a pair of vertical side members, or stiles, that are typically 1 inch or 1⅜ inches (2.5 cm or 3.5 cm) wide if one includes the bevelled portion of the stile. The outside edge of the left stile would be defined by line 118 for a door that is 17⅝ inches (44.8 cm) wide. The inside edge of this stile would be defined by line 120 if the bevelled portion is excluded or line 122 if the bevelled portion is included.

The inside edge and outside edge of the right stile would be defined by lines 122' and 118', respectively, for the largest width door (a 36 inch bifold door). As before, one may use line 120' instead of line 122' if one does not wish to cover the beveled portion of the stile.

For progressively smaller doors the outside edge of the right stile would be defined by one of the three alternate lines 126, which correspond to doors having an overall width of 11⅝, 14⅝, or 15⅝ inches (29.5, 37.1, or 39.7 cm). These dimensions correspond to what is commonly referred to as 24 inch, 30 inch, and 32 inch bifold doors. After marking the outside dimension for these smaller doors, the portion between lines 118' and 122' will be repositioned by moving line 118' inwardly to the position juat marked in connection with one of the lines 126 based on the door size. Again, the portion between lines 120' and 122' may or may not be used depending upon whether one wishes to cover the beveled portion of the stile.

It will be appreciated that the various dimensions mentioned herein are exemplary and that typical dimensions may be different in different localities, or in different eras. As before, the region between lines 120' and 122' may or may not be used depending on whether the installer is covering the bevel. Overall, the pattern of FIG. 17 may be used to cut out a single piece of wallpaper in a "figure 8" pattern. Alternatively, five separate pieces of wallpaper may be cut to cover the three horizontal cross-members and the two vertical stiles.

To assist the installer in defining the overall dimensions of the wallpaper pattern, major marking holes are provided, namely, left marking holes 128A, and right marking holes 128B. Marking holes 128B are shown as an upper and lower trio of holes located at the corners found at the ends of lines 126 and 118'.

Figure 18:
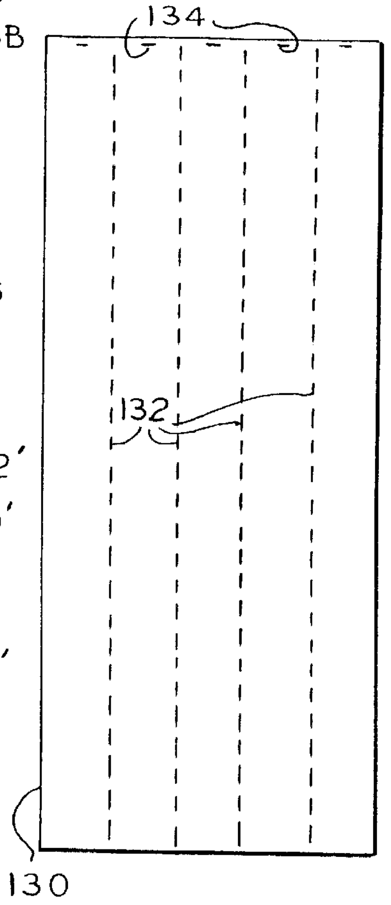
FIG. 18 is a front view of this sheet having apertures forming a template for use with the slats of a vertical blind.

Referring to FIG. 18, a template 130 provides a closure pattern and is shown as a rectangular sheet with an exemplary width of 17.5 inches (44.5 cm) and with exemplary lengths of 82.5 inches (2.1 m) or 90 inches (2.3 m). Equidistantly spaced lines 132 divide template 130 into five slats that correspond to the slats found in typical vertical blinds. Lines 132 are a series of spaced slits through which the underlying wallpaper can be marked. Near the top of each of the slats are hanging holes 134, typically ⅝ inches (16 mm) long and ⅛ inches (3.2 mm) tall. These holes have rounded corners and are slightly offcentered to give an appearance of centeredness when the associated vertical slats are closed and slightly overlapping. Because of the ¼" overlap of the vertical vanes when the blind is closed; the template will indicate that more complex wallpaper patterns may require movement of each vane, after lining up the initial vane, ¼" higher or lower to maintain continuity of the wallpaper pattern when the blind is closed.

Figure 19B:
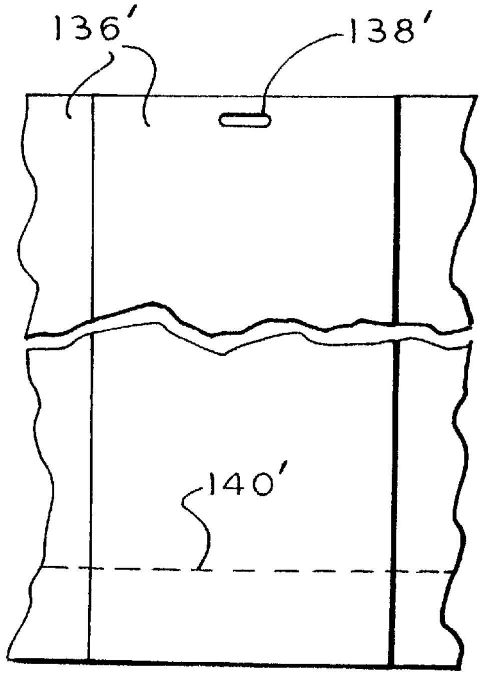
FIG. 19B is a front view of a template sheet for marking wallpaper in order to produce multiple pieces for covering slats in a vertical blind.
Figure 19A:
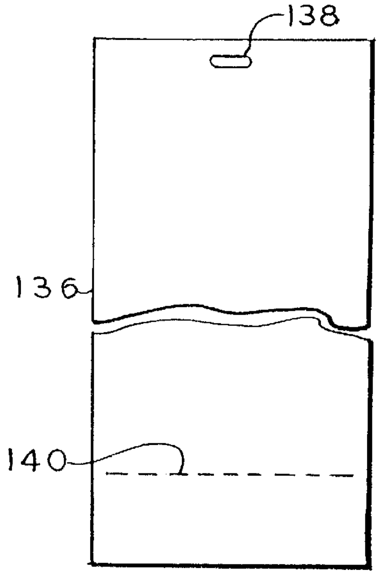
FIG. 19A is a front view of a template sheet for marking wallpaper in order to produce a single piece for covering a slat in a vertical blind.

Referring to FIG. 19A, an alternate template 136 has a closure pattern designed to allow one to trace the outline of a single slat for vertical blinds. Thus the embodiment of FIG. 19 is an alternate to that of FIG. 18. As before, template 136 has a hanging hole 138. Near the bottom of template 136 a series of short interrupted slits 140 can be used to mark the bottom of a wallpaper piece for shorter sized blinds. In the alternate embodiment of FIG. 19B, the template is expanded to allow one to cut coverings for multiple slats with a single template. Corresponding elements have been marked with a prime notation.

Figure 20:
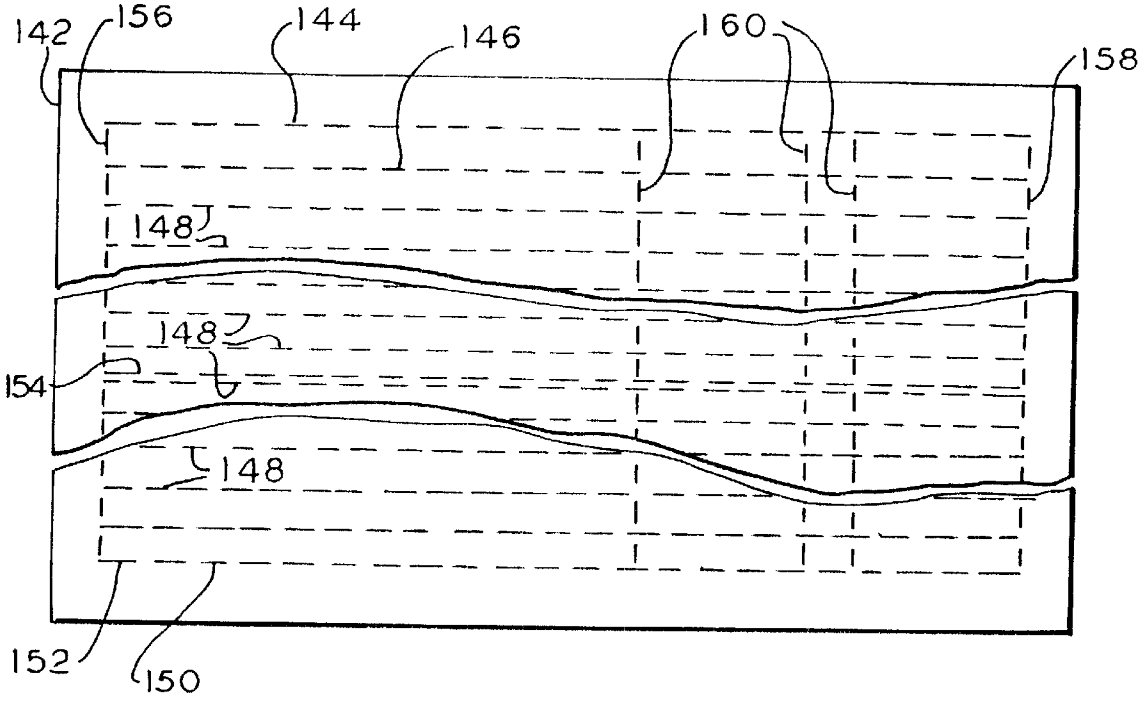
FIG. 20 is a sheet with apertures forming a template for covering and louver slats in a door of the type associated with that of FIG. 17.

Referring to FIG. 20, the template 142 has a closure pattern in the form of a number of parallel, transverse lines 144, 146, 148, and 150 that define the height for wallpaper pieces designed to cover slats on a louvered door, such as the one associated with the template of FIG. 17. The height of each of these pieces will typically be 1⅜ inches (3.5 cm), except for the top piece located between lines 144 and 146 and the bottom piece located between lines 150 and 152. These top and bottom pieces will be slightly shorter and will typically be 1 5/16 inches (3.3 cm) high.

The illustrated template has a number of short, interrupted slits that can be used to mark wallpaper pieces for a door that has a number of louver slats above a central cross-member and below it a different number of slats. A full complement of wallpaper pieces can be produced by using all of the lines from transverse line 144 to line 152 (except line 154) in order to cover all of the louver slats above the central cross-member. Normally, the louver slats below the central cross-member are fewer in number. Therefore, the installer will cut wallpaper pieces using all of the lines above line 154. Line 154 defines the bottom of the last wallpaper piece. Line 154 is spaced 1 5/16 inches (3.3 cm) from the line 148 immediately above it. Thus, line 154 defines the typically shorter piece associated with the final louver slat in a series.

For wide doors, the installer will mark pieces using the outer lines 156 and 158. For narrower doors the installer may use one of the alternate lines 160. In embodiments accommodating standard louvered doors, the wallpaper pieces may be cut in widths of 15¼, 13¼, 12¼, and 9¼ inches (38.7, 33.6, 31.1, and 23.5 cm). It will be appreciated that different dimensions may be used for other embodiments designed to accommodate doors of different sizes and designs.

Figure 21:
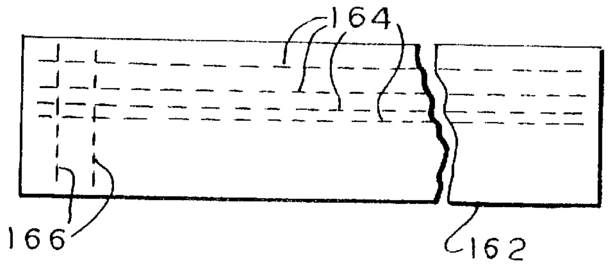
FIG. 21 is a front view of a template sheet having apertures for producing a single wallpaper piece for covering a single louver slat.

Referring to FIG. 21, template 162 has a closure pattern that can be used to mark a single wallpaper piece for covering a single louver slat. For the largest slats, the border of template 162 may be used to trace the outline of the wallpaper piece. For smaller slats the installer can use alternate longitudinal lines 164 and alternate transverse lines 166. Preferably, the outline of template 162 and the position of lines 164 and 166 will be chosen to accommodate the typical, popular slats sizes, taking into account the need to cut smaller pieces for the first and last slat in a series.

Obviously, many modifications and variations of the present invention are possible in light of the above teachings. It is therefore to be understood that within the scope of the appended claims, the invention may be practiced otherwise than as specifically described.

What is claimed is:

1. Wallpaper template for cutting wallpaper pieces for covering a closure having a spaced plurality of segments, comprising:

a sheet having a plurality of apertures arranged to define (a) a segment pattern for outlining each of the segments and arranged to define a contiguous plurality of rectangles, the contiguous plurality of rectangles being fewer in number than the plurality of segments of the closure, so that the plurality of contiguous rectangles can be repeatedly marked on and cut out of wallpaper in separate groups for covering the segments of the closure in stages; and (b) a closure pattern for outlining the closure.

2. Wallpaper template according to claim 1 wherein said apertures comprise compact round holes.

3. Wallpaper template according to claim 1 wherein said apertures comprise slots.

4. Wallpaper template according to claim 1 wherein said apertures comprise a combination of slots and compact round holes.

5. Wallpaper template according to claim 1 wherein said spaced plurality of segments comprise slats, so that the plurality of contiguous rectangles can be marked on and cut out of wallpaper without waste intervening between the rectangles.

6. Wallpaper template according to claim 1 wherein said spaced plurality of segments comprise slats with central longitudinal ridges, said apertures being arranged to define a plurality of pairs of rectangles, each pair of rectangles being sized to overlay the slats on opposite sides of said ridges.

7. Wallpaper template according to claim 1 wherein said apertures are perforations arranged to allow a figure corresponding to said closure to be pressed out of said sheet, so that the figure can be placed over wallpaper and used as a template.

8. Wallpaper template according to claim 1 wherein said apertures are perforations arranged to allow a figure corresponding to at least one of said segments to be pressed out of said sheet, so that the figure can be placed over wallpaper and used as a template.

9. Wallpaper template according to claim 1 wherein said apertures are perforations arranged to allow a figure corresponding to at least one of said segments to be pressed out of said sheet, so that the opening produced by removal of the figure can be placed over wallpaper and used as a template.

10. Wallpaper template for cutting wallpaper pieces for covering a closure having a spaced plurality of slats, comprising:

a container sized to hold said closure and having indicia arranged to define a closure pattern for outlining the closure, so that wallpaper can be out by following the indicia on said container, said indicia being arranged to define a plurality of rectangles, the plurality of rectangles being contiguous and fewer in number than the plurality of slats of the closure, so that the plurality of rectangles can be repeatedly marked on and cut out of wallpaper in separate groups for covering the slats of the closure in stages.

11. Wallpaper template according to claim 10 wherein said indicia comprise apertures.

12. Wallpaper template according to claim 10 wherein said indicia comprise compact round holes.

13. Wallpaper template according to claim 10 wherein said apertures comprise slots.

14. Wallpaper template according to claim 10 wherein said apertures comprise a combination of slots and compact round holes.

15. Wallpaper template according to claim 10 wherein the plurality of rectangles are contiguous and fewer in number than the plurality of segments of the closure, so that the plurality of rectangles can be repeatedly marked on and cut out of wallpaper in separate groups for covering the slats of the closure in stages.

16. Wallpaper template according to claim 10 wherein said indicia are perforations arranged to allow a figure corresponding to said closure to be pressed out of said container, so that the figure can be placed over wallpaper and used as a template.

17. Wallpaper template for cutting wallpaper pieces for covering a closure having a spaced plurality of segments, comprising:

a sheet having indicia arranged to define (a) a segment pattern for outlining each of the segments, said segments comprising slats, said indicia being arranged to define a contiguous plurality of rectangles, so that the plurality of contiguous rectangles can be marked on and cut out of wallpaper without waste intervening between the rectangles; and (b) a closure pattern for outlining the closure, so that wallpaper can be cut by following the indicia on said sheet.

18. Wallpaper template according to claim 17 wherein said indicia define a figure corresponding to at least one of said segments, so that said figure can be cut out of said sheet and placed over wallpaper for use as a template.

19. Wallpaper template according to claim 17 wherein said indicia define a figure corresponding to at least one of said segments, so that said figure can be cut out of said sheet to leave an opening that can be placed over wallpaper and used as a template.

20. Wallpaper template for cutting wallpaper pieces for covering a closure having a spaced plurality of segments, comprising:

sheet having indicia arranged to define (a) a segment pattern for outlining each of the segments and arranged to define a contiguous plurality of rectangles that are fewer in number than the plurality of segments of the closure, so that the plurality of contiguous rectangles can be repeatedly marked on and cut out of wallpaper in separate groups for covering the segments of the closure in stages; and (b) a closure pattern for outlining the closure, so that wallpaper can be cut by following the indicia on said sheet.

21. Wallpaper template for cutting wallpaper pieces for covering a closure having a spaced plurality of segments comprising slats with central longitudinal ridges, said template comprising:

a sheet having indicia arranged to define (a) a segment pattern for outlining each of the segments, said indicia being arranged to define a plurality of pairs of rectangles, each pair of rectangles being sized to overlay the slats on opposite sides of said ridges; and (b) a closure pattern for outlining the closure, so that wallpaper can be out by following the indicia on said sheet.

22. Wallpaper template for cutting wallpaper pieces for covering a closure having a spaced plurality of segments comprising slats with central longitudinal ridges, said template comprising:

a container sized to hold said closure and having indicia arranged to define a closure pattern for outlining the closure, so that wallpaper can be cut by following the indicia on said container, said indicia being arranged to define a plurality of pairs of rectangles, each pair of rectangles being sized to overlay the slats on opposite sides of said ridges, so that the plurality of rectangles can be marked on and cut out of wallpaper to cover the slats.

23. Wallpaper template for cutting wallpaper pieces for covering a closure having a spaced plurality of segments, comprising:

a container sized to hold said closure and having indicia arranged to define a closure pattern for outlining the closure, so that wallpaper can be out by following the indicia on said container, said indicia being arranged to define a plurality of rectangles, so that the plurality of rectangles can be marked on and cut out of wallpaper to cover the segments, said indicia being perforations arranged to allow a figure corresponding to at least one of said segments to be pressed out of said container, so that the figure can be placed over wallpaper and used as a template.

24. Wallpaper template for cutting wallpaper pieces for covering a closure having a spaced plurality of segments, comprising:

a container sized to hold said closure and having indicia arranged to define a closure pattern for outlining the closure, so that wallpaper can be cut by following the indicia on said container, said indicia being perforations arranged to allow a figure corresponding to at least one of said segments to be pressed out of said container, so that the opening produced by removal of the figure can be placed over wallpaper and used as a template.

25. Wallpaper template for cutting wallpaper pieces for covering a door, shutter or blind having a spaced plurality of slats, comprising:

a sheet having indicia arranged to define a segment pattern for outlining the slats of the door, shutter, or blind, so that wallpaper can be cut to cover the slats by following the indicia on said sheet, said indicia being arranged to define a contiguous plurality of rectangles, so that the plurality of contiguous rectangles can be marked on and cut out of wallpaper without waste intervening between the rectangles.

26. Wallpaper template for cutting wallpaper pieces for covering a doors shutter or blind having a spaced plurality of segments comprising slats, said template comprising:

a sheet having indicia arranged to define a segment pattern for outlining the slats of a door, shutter, or blind, so that wallpaper can be cut to cover the slats by following the indicia on said sheet, said indicia being arranged to define a rectangle corresponding to one of said slats, so that the plurality of contiguous rectangles can be marked on and out out of wallpaper by repeatedly using the rectangle.

* * * * *